Dec. 14, 1926.
E. S. RANDOLPH ET AL
1,610,587
STUBBLE CLEANER
Filed May 29, 1922   4 Sheets-Sheet 2
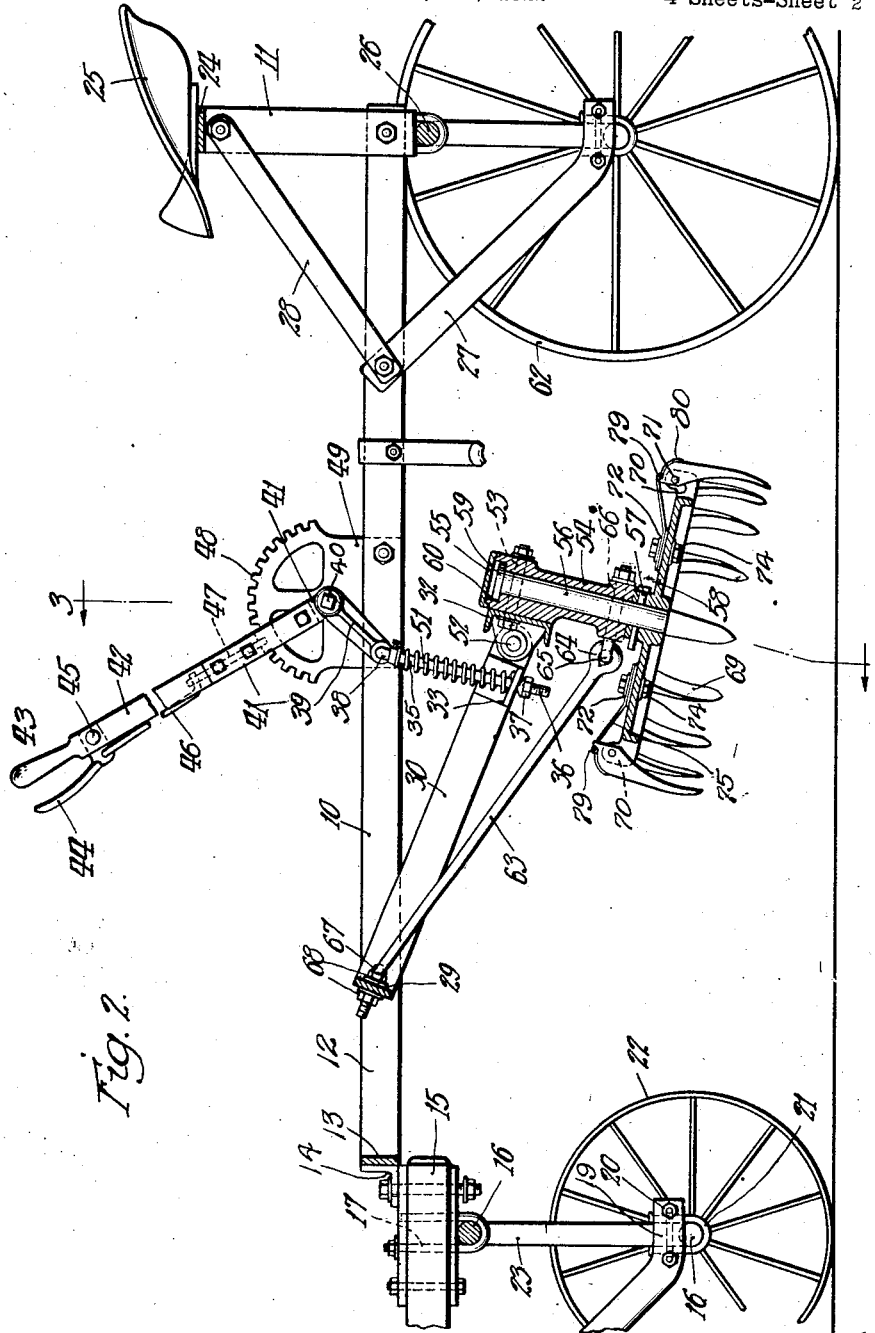
Fig. 2
Inventors
Edward S. Randolph
Lemuel C. Randolph
Jabel & Mueller Attys.

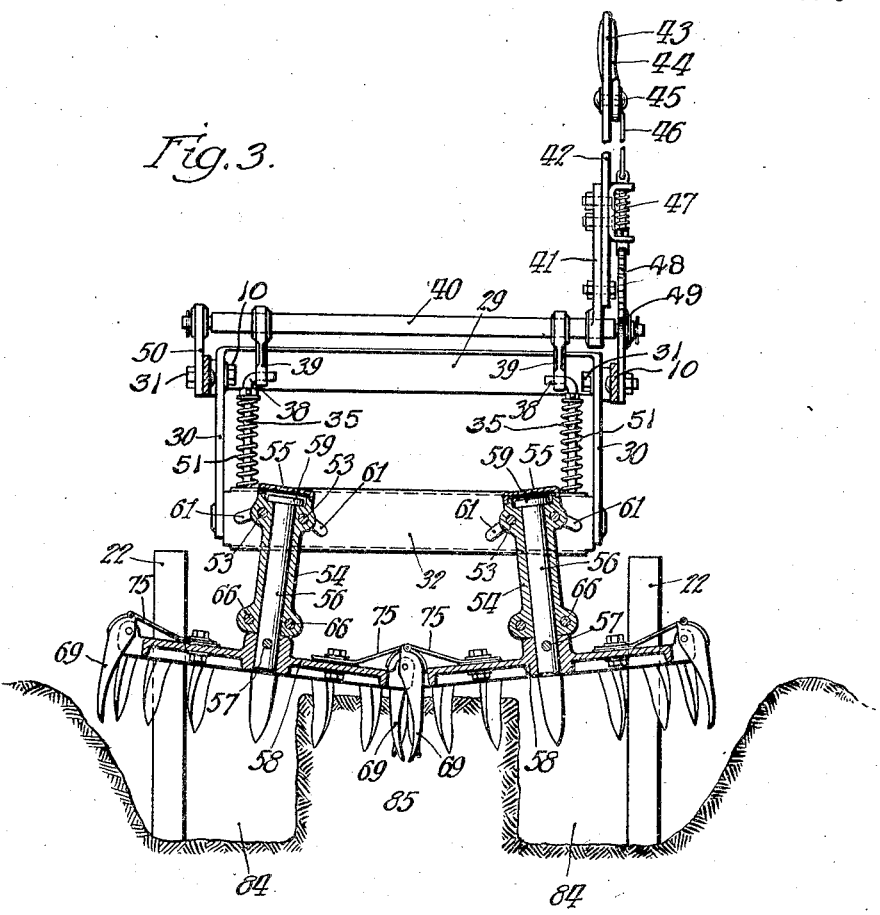
*Fig. 3.*
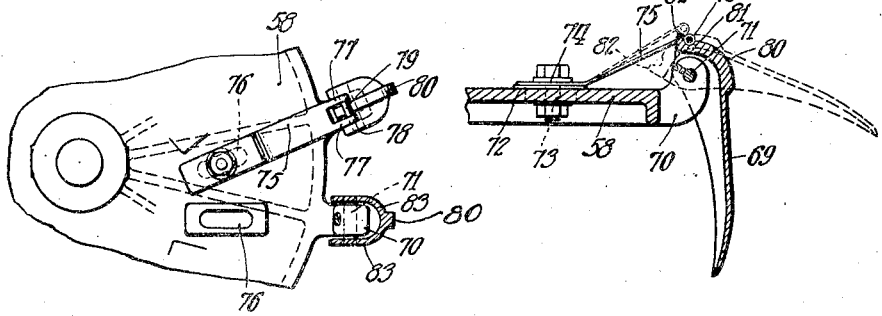
*Fig. 5.*  *Fig. 6.*
Inventors
Edward S. Randolph
Lemuel C. Randolph Dec. 14, 1926.
E. S. RANDOLPH ET AL
1,610,587
STUBBLE CLEANER
Filed May 29, 1922       4 Sheets-Sheet 4
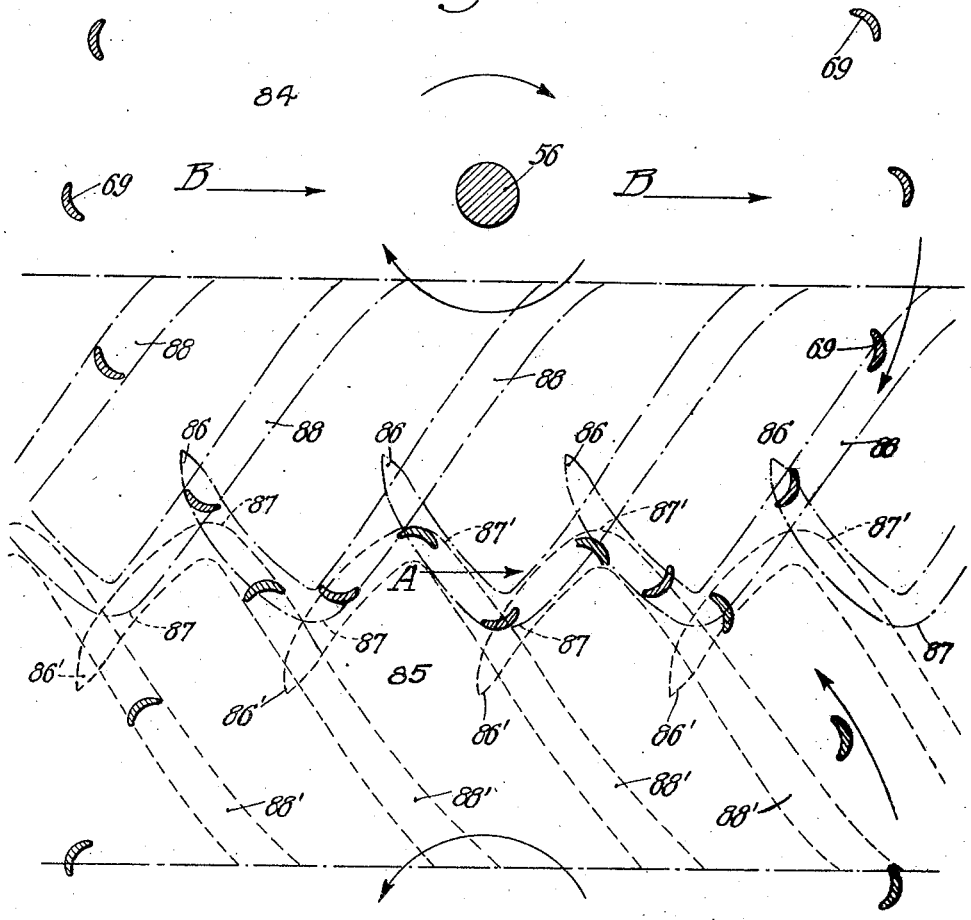
Fig. 4.
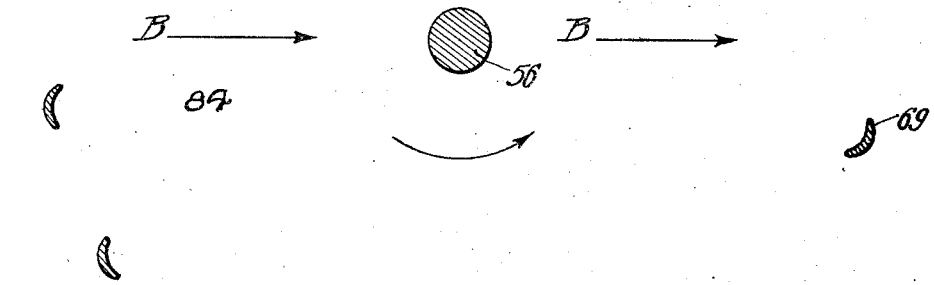
Inventors.
Edward S. Randolph.
Lemuel C. Randolph.
Jabel & Mueller Attys.

Patented Dec. 14, 1926.

1,610,587

UNITED STATES PATENT OFFICE.

EDWARD S. RANDOLPH, OF BALBOA HEIGHTS, CANAL ZONE, AND LEMUEL C. RANDOLPH, OF BAYOU GOULA, LOUISIANA.

STUBBLE CLEANER.

Application filed May 29, 1922. Serial No. 564,646.

Our invention relates to agricultural implements, and more particularly to a machine for cleaning sugar cane stubble. In cultivating sugar cane for a new crop it is customary to cut a furrow on each side of the row of cane stubble with a plow, and after this has been done it has been customary to remove the soil about the stubble by hoeing, this being a hand operation.

It is a purpose of the invention to provide means for cultivating the sugar cane stubble in such a manner as to avoid this hand operation.

It is a further purpose of the invention to provide a device for cultivating sugar cane which comprises a plurality of rotating members having teeth mounted thereon, which are adapted to engage with the soil about the cane stubble and drag the same from the top of the row and deposit it in the furrow at each side, which furrow was made by plowing as above described. This is done for the purpose of removing the dirt from the top of the cane in the early spring to allow the sun and air to get to the roots and sprout the cane. More specifically it is a purpose of the invention to provide a machine for cultivating sugar cane which performs the work previously done by means of a hoe by hand; which comprises a pair of disks set opposite each other at a slightly inclined position, said disks being mounted on a carriage and being allowed to rotate as the carriage moves forwardly, the rotation being brought about by the engagement of teeth provided on the disks with the ground. The disks are preferably so mounted that the teeth intermesh.

It is further a purpose of the invention to provide a device of the above described character with teeth which are held in operative position by means of a spring device, so that when an unusual force is applied to a tooth, as when one of the teeth strikes one of the stalks, the tooth will spring from a normally vertical position, thus preventing uprooting of the sugar cane stalks.

It is still a further purpose of the invention to mount the disks referred to above adjustably, so that the same can be tilted either laterally or longitudinally to any degree desired, and also to adjustably mount the teeth on the disks.

It is also a purpose of the invention to provide a device of the above mentioned character having the teeth so mounted that the same will enter the ground forwardly of the center line of the disks and will gradually enter farther into the ground so that the earth will be dragged by the teeth outwardly from the center line of the road towards the sides thereof.

It is another object of the invention to provide a device of the above mentioned character which has the toothed carrying disks so mounted that the same will not throw the machine off its course as said disks rotate.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes and modification of parts as would occur to a person skilled in this art and as would fall within the scope of the claims.

In the drawings:

Fig. 2 is a side elevation partly in section and partly broken away of our improved machine;

Fig. 3 is a section taken on the line 3—3 of Fig. 2;

Fig. 4 is a diagrammatic plan view showing the path of the teeth on the disks and the path thereof through the soil;

Fig. 5 is a fragmentary plan view of one of the disks; and

Fig. 6 is a fragmentary sectional view showing a portion of a disk showing the manner in which the teeth are mounted thereon.

Figure 1:
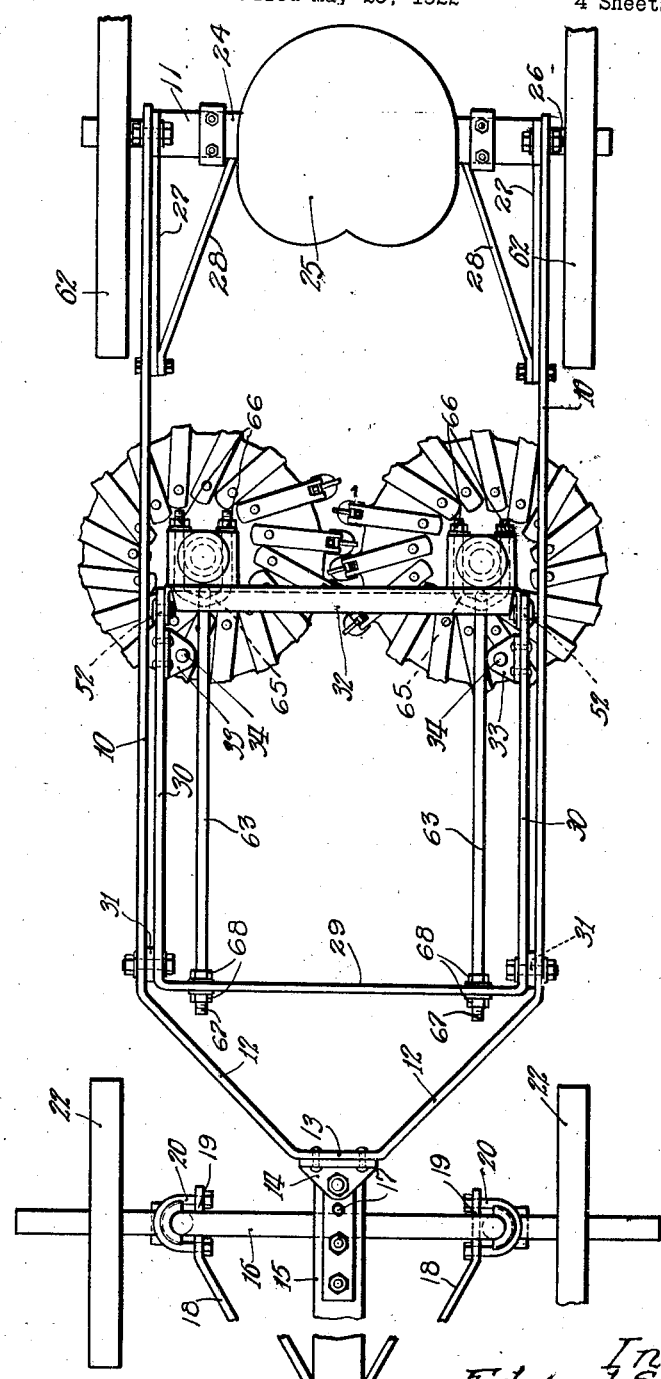
Fig. 1 is a plan view partly broken away of our improved stubble cleaning machine.

Referring in detail to the drawings, the improved stubble cleaning machine is mounted on a framework comprising the longitudinally extending side members 10 and the rear transverse member 11, said longitudinal members 10 being connected by the obliquely extending portions 12 which are provided with the transverse connecting portions 13 upon which the bearing plate 14 is mounted, which carries the tongue 15, said tongue 15 being connected with the axle 16 by means of the U-bolts 17 and by means of the diagonally extending braces 18 which are connected at the lower ends 19 thereof with the axle 16 by means of the U-bolts 20 and the U-shaped members 21 mounted on the axle 16 of the front wheels 22. The parts described above may be of any desired or preferred construction, the axle 16 being shown as being offset as at 23 to provide a central raised portion in the form illustrated, this being done to enable the wheels to pass along in the furrow at each side of the row without the axle interfering with the row itself. The rear transverse member 11 of the frame is also offset so as to form a raised portion 24 for receiving the seat 25 thereon. The rear axle 26 is made in a similar manner to the front axle 16, and is secured to the diagonally extending braces 27 in a similar manner to that in which the front axle 16 is secured to the members 18. A diagonally extending brace 28 is also provided between the side member 10 and the raised portion 24 of the transverse member 11. Mounted on said outer framework comprising the members 10 and 11 is an inner framework having the transversely extending portion 29 and the longitudinally extending portion 30, said portions 29 and 30 forming a U-shaped member. Said U-shaped member is pivotally mounted on the side members 10 by means of the bolts 31 and the legs 30 of the U-shaped member connected with the free ends by means of the transversely extending member 32. The longitudinally extending members 30 of the framework are provided with apertured ears 33 through the apertures 34 of which extend the rods 35 which are provided with the threaded end portions 36 having the nuts 37 screwed thereon. The upper ends of the rods 35 are hook-shaped as shown at 38 and extend through eyes in the arms 39 which are mounted on the transverse shaft 40 so as to turn therewith, said shaft 40 being provided with an actuating lever 41 for turning the same to various desired positions, said lever 41 being provided with a handle member 42 having a handle 43 on the end thereof and being provided with a grip 44 pivoted thereto at 45, which is connected by means of a link 46 with the detent or finger 47 which is adapted to enter the recesses between the teeth in the rack 48 to hold the lever in any desired position, said rack being provided on a plate 49 mounted on one of the side members 10, the other end of the shaft 40 being mounted in a bearing plate 50 secured to the opposite side member 10.

Mounted between the hook-shaped ends 38 of the rods 35 and the ears 33 are compression springs 51 which are provided for holding the framework comprising the U-shaped member in a downward position, but which will permit upward movement of said framework when an unusual strain is placed thereon. The transverse member 32 is mounted to swivel relative to the side members 30 on the bolts 52. Secured to the member 32 by means of bolts 53 are the tubular casings 54 which are provided with the removable caps 55 and within which are mounted shafts 56 which are adapted to turn therein. Pinned to the lower extremities of the shafts 56 by means of the pins 57 are the disks 58. The upper ends of the shafts 56 are provided with heads 59 which seat in the recesses 60 in the casing members 54. The bolts 53 extend through inclined slots 61 in the member 32 so that the casing members 54 can be adjusted to various angular positions relative to a vertical longitudinal plane of the machine as circumstances may require. It will be seen that the height of the disks above the tread surface of the front wheels 22 and rear wheels 62 can be adjusted by means of the lever 41, as the position which the lever 41 occupies will determine the height of the disks 58 above the tread surface due to the fact that the frame comprising the side members 30 can be raised and lowered as desired by means of said lever 41. The position of the U-shaped framework also determines to a certain extent the inclination of the disks to a vertical transverse plane of the machine, but this inclination may be adjusted by means of the rods 63 having the eyes 64 at one of the ends thereof which embrace the bight portion 65 of the U-bolts 66 which extend through the casings 54. The opposite ends of the rod 63 are screwthreaded as at 67 and extend through the transverse portion 29 of the U-shaped frame 30, said rods 63 being accordingly adjustable in the transverse members 29 and being held in adjusted position by means of the nuts 68. In view of the fact that the member 32 is swiveled on the U-shaped frame, and due to the fact that the distance of the eye 64 from the transverse member 29 can be varied, the angularity of the disks 58 can be adjusted by adjustment of the member 63 at the screwthreaded end 67 thereof. The disks 58 are provided with a plurality of teeth 69 which are curved in cross section, as will be clear from Figs. 2 to 6 inclusive. Said teeth 69 are pivoted to the ears 70 projecting from the disks 58 on the pivot pins 71. The disks 58 are also provided with bosses 72 and with openings 73 through which bolts 74 extend. Secured to the disks 58 by means of the bolts 74 are the blade springs 75, said springs being provided with slots 76 so that the same may be adjusted inwardly or outwardly as desired on the portion 74. The outer ends of the springs 75 are provided with bifurcated portions 77 which are curled over at the ends to form the eyes 78, a rod-like member 79 extending through said eyes and across the space between the bifurcations. The tooth 69 is provided with a rib 80 on the upper surface thereof at one end of which is a groove or recess 81 in which the curved end 78 of the spring is adapted to rest, and said tooth 69 is also provided with a projection 82 behind which the cross bar 79 is adapted to rest to hold the tooth in the position shown in Fig. 6 in full lines. If the tooth strikes a root or other hard matter in the soil, the same will be thrown upwardly against the tension of the spring forcing the members 78 out of the groove 81 throwing the tooth into the dotted line position shown in Fig. 6. It will be seen that the adjustment of the spring adjusts the position of the tooth 69.

It will thus be seen that the teeth will not uproot the sugar cane as the teeth will be thrown out of engagement with the ground when an obstruction, such as the roots of the cane, is struck. The teeth are concave as clearly shown in Fig. 4, and are so mounted that the concave faces thereof may be forward as the disk members rotate with the shafts 56. The upper end portions of the teeth are bifurcated as shown at 83, so as to extend on opposite sides of the lugs 70 through which the pivot pins 71 pass.

Referring now to Fig. 4 it will be seen that as the vehicle moves forwardly in the direction as indicated by the arrow A in Fig. 4, the disks will be drawn forwardly in the direction of the arrows B in Fig. 4. Due to the inclination of the disks downwardly from the sides of the machine toward the center thereof, the teeth will engage with the ground only on the inner sides of the disks and accordingly the forward movement of the carriage will cause the disks to rotate in opposite directions. The disk mounted on the shaft 56 in the lower part of Fig. 4 will rotate in a counterclockwise direction, and the disk mounted on the upper shaft 56 in Fig. 4 will rotate in a clockwise direction.

As shown in Fig. 3 the furrows 84 are plowed on opposite sides of the row 85. The row 85 is diagrammatically shown in Fig. 4 as being between the straight dot and dash lines in said figure, while the furrows 84 are on opposite sides of said row. The teeth 69 on the disk on the upper shaft will enter the row forwardly of the shaft 56 and to the right thereof, and at this time the tooth will be in such position as to be just entering the soil, and due to the inclination of the disks toward the rear and toward the center line of the row, the teeth will enter the row near the center thereof at substantially the points marked 86 in the diagram, after which they will be moved forwardly and inwardly toward the center of the row due to the forward movement of the carriage and the rotation of the disk upon which they are mounted until they reach the points marked 87, at which time the teeth will have reached their innermost position relative to the center line of the machine, after which they will travel outwardly toward the side edge of the row along the path marked 88 gradually digging deeper into the earth as they reach the edge portion of the row due to the inclination of the disks. The teeth on the disk shown in the lower part of Fig. 4 in a similar manner enter the soil at the points indicated by the numerals 86', traveling toward the center of the row and turning at 87', after which they travel toward the outer edge of the row along the paths 88'. The paths of the teeth on the disk shown in the lower part of Fig. 4 are shown in dotted lines, while those of the teeth on the disks shown in the upper part of Fig. 4 are shown in dot and dash lines.

It will be seen from Figs. 3 and 4 that the teeth on the disks intermesh and that the paths followed by the teeth overlap, thus causing the entire row to be hoed, and due to the arrangement of the disks in direct transverse alignment prevent the carriage from being thrown off its course by the action of the disks carrying the teeth.

Having thus described our invention, what we desire to claim and secure by U. S. Letters Patent is:

1. A machine of the character described, comprising a pair of rotating members arranged opposite each other transversely of said machine, each of said members being provided with a circular series of long narrow teeth, said members being mounted on fixed oblique axes arranged at an angle both transversely and longitudinally of said machine such that said teeth enter and leave the ground during each revolution thereof, each of said teeth engaging the ground as it moves toward the opposite member and gradually entering the ground to a greater extent as it moves away from said member.

2. A machine of the character described comprising a pair of rotating members arranged opposite each other transversely of said machine, and teeth on said members adapted to engage the ground, said teeth being adjustable relative to the center of rotation of the member upon which the same are mounted.

3. A machine of the character described comprising a pair of ground engaging members mounted for free rotation on said machine and arranged opposite each other transversely of said machine, said members rotating about axes inclined lengthwise of said machine with the lower ends of said axes forwardly of the upper ends of said axes and inclined transversely of said machine so that said axes diverge downwardly, and teeth on said members adapted to enter 4. A machine of the character described comprising a pair of ground engaging members mounted for free rotation on said machine and arranged opposite each other transversely of said machine, said members rotating about axes inclined lengthwise of said machine with the lower ends of said axes forwardly of the upper ends of said axes and inclined transversely of said machine so that said axes diverge downwardly, and teeth on said members set at an angle to the radius of said members adapted to enter the ground through the forward and outward portion of their movement to move the soil in opposite directions away from each other.

5. A machine of the character described comprising a pair of ground engaging members mounted for free rotation on said machine and arranged opposite each other transversely of said machine, said members rotating about axes inclined lengthwise of said machine with the lower ends of said axes forwardly of the upper ends of said axes and inclined transversely of said machine so that said axes diverge downwardly, and concave, shovel-like teeth on said members set at an angle to the radius of said members so that the concave faces thereof are presented forwardly during the forward and outward movement of said teeth, said teeth being adapted to enter the ground through the forward and outward portion of their movement to move the soil in opposite directions away from each other.

6. In a device of the character described, a framework, a member mounted for rotation thereon, said member being mounted to rotate on an axis inclined to the vertical both transversely and longitudinally of said framework, means for adjusting the transverse inclination of said axis, means for raising and lowering said member relative to said framework, and means independent of said raising and lowering means for adjusting the longitudinal inclination of said axis.

7. In a device of the character described, a framework, a member mounted for rotation thereon, said member being mounted to rotate on an axis inclined to the vertical both transversely and longitudinally of said framework, means for adjusting the inclination of said axis, means for raising and lowering said member relative to said framework, and depending teeth on said member, said teeth being inclined to the radius of said member.

8. In a device of the character described, a framework, a member mounted for rotation thereon, said member being mounted to rotate on an axis inclined to the vertical both transversely and longitudinally of said framework, means for adjusting the inclination of said axis in both directions, means for raising and lowering said member relative to said framework, and depending teeth on said member, said teeth being adjustable to vary the angularity thereof relative to the face of said member.

9. A device of the character described comprising a framework, a member mounted for rotation thereon and ground engaging means on said rotatable member, said rotatable member being mounted to yield when the same engages an obstruction and said ground engaging means being releasably mounted to move out of ground engaging position independently of said rotatable member when said means engages an obstruction.

10. A device of the character described comprising a framework, a member mounted for rotation thereon and ground engaging means on said rotatable member, said rotatable member being yieldably mounted to swing upwardly when the same engages an obstruction, and said ground engaging means being releasably mounted to move out of ground engaging position independently of said rotatable member when said means engages an obstruction.

11. In a device of the character described, a framework, a member mounted for rotation thereon, said member being mounted to rotate on an axis inclined to the vertical both transversely and longitudinally of said framework, means for adjusting the transverse inclination of said axis and means for independently adjusting the longitudinal inclination of said axis.

12. A machine of the character described comprising a pair of ground engaging members mounted for free rotation on said machine and arranged opposite each other transversely of said machine, said members rotating about axes inclined lengthwise of said machine with the lower ends of said axes forwardly of the upper ends of said axes and inclined transversely of said machine so that said axes diverge downwardly, ground engaging means on said members, means for independently adjusting the divergence of said axes and means independent of said last mentioned means for adjusting the lengthwise inclination of said axes.

13. A machine of the character described comprising a pair of ground engaging members mounted for free rotation on said machine and arranged opposite each other transversely of said machine, said members rotating about axes inclined lengthwise of said machine with the lower ends of said axes forwardly of the upper ends of said axes and inclined transversely of said machine so that said axes diverge downwardly, ground engaging means on said members, means for independently adjusting the divergence of said axes, means independent of a said last mentioned means for adjusting the lengthwise inclination of said axes, and means for adjusting the position of said ground engaging members as a unit.

In witness whereof, we hereunto subscribe our names this 10th day of March A. D., 1922 and 15th day of April, 1922, respectively.

EDWARD S. RANDOLPH.
LEMUEL C. RANDOLPH.